United States Patent [19]

Brenneman et al.

[11] 3,961,913
[45] June 8, 1976

[54] PROCESS FOR TREATING ORGANIC WASTES AND PRODUCT THEREOF

[75] Inventors: Richard S. Brenneman, Natick; John J. Clancy, Westwood, both of Mass.

[73] Assignee: Combustion Equipment Associates, Inc., New York, N.Y.

[22] Filed: Mar. 29, 1974

[21] Appl. No.: 456,338

[52] U.S. Cl. ................................ 44/1 D; 44/10 A; 44/51
[51] Int. Cl.² ...................... C10L 9/02; C10L 5/00; C10L 1/32
[58] Field of Search .............. 44/1 D, 1 R, 10 R, 51, 44/10 A

[56] References Cited
UNITED STATES PATENTS

| | | | |
|---|---|---|---|
| 2,242,822 | 5/1941 | Fuchs | 44/51 X |
| 2,397,859 | 4/1946 | Hersberger et al. | 44/51 |
| 2,423,913 | 7/1947 | Vose | 44/51 |
| 3,436,312 | 4/1969 | Leonor | 44/1 R X |
| 3,830,636 | 8/1974 | Marsh | 44/1 D |

*Primary Examiner*—Carl F. Dees
*Attorney, Agent, or Firm*—Blum, Moscovitz, Friedman & Kaplan

[57] ABSTRACT

A process for treating the organic fraction of solid waste material with acid at an elevated temperature to form an embrittled material reducible to a powdered fuel having a caloric value and weight (on a dry basis) essentially equivalent to the waste material from which it was formed. The density of the fuel may be materially increased over that of the original waste material without the expenditure of excessive energy such as would be required in the grinding of untreated waste. The resulting fuel can be used alone or in combination with other fuels including fossil fuels in gas, liquid or solid form.

58 Claims, 1 Drawing Figure

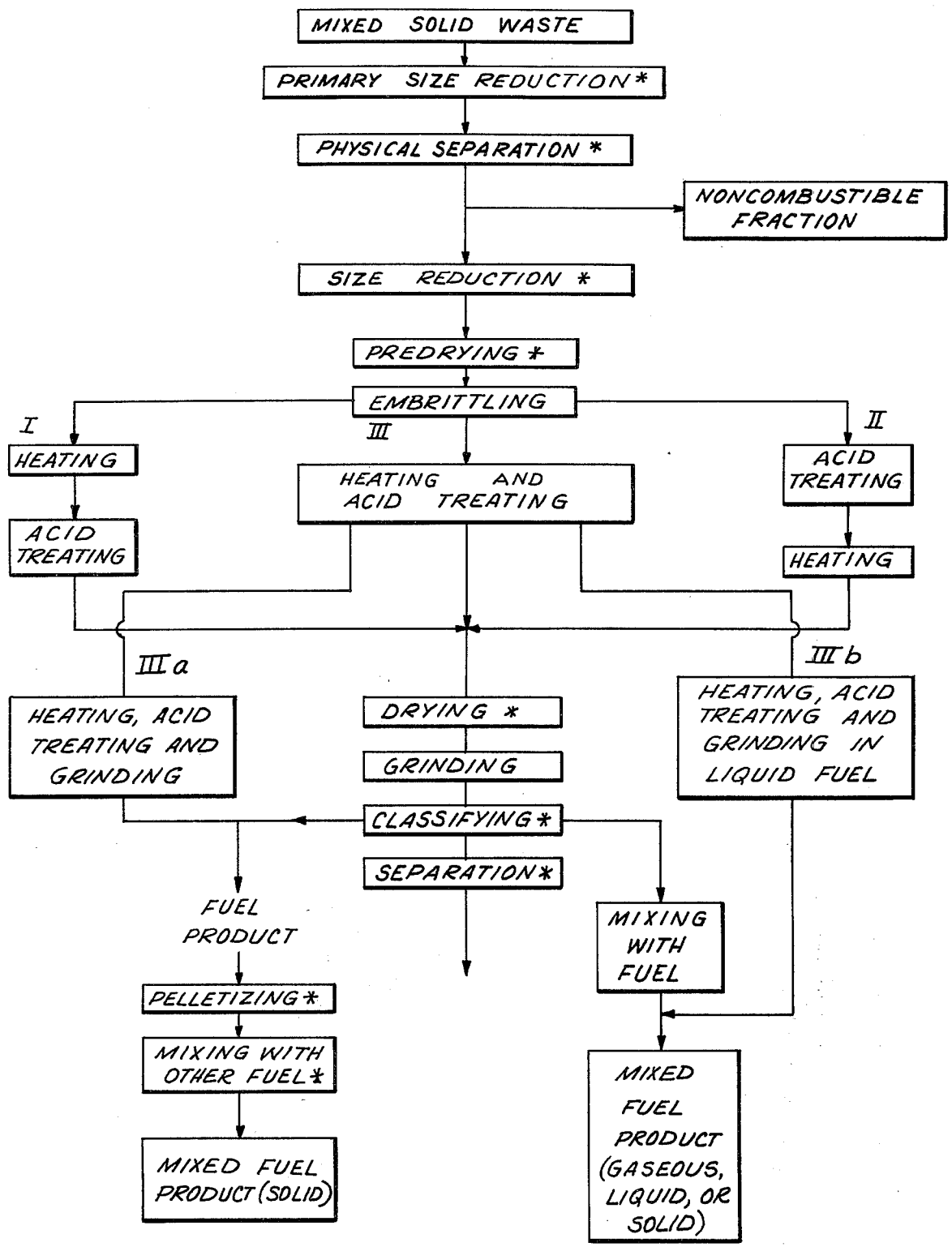

PROCESS FOR TREATING ORGANIC WASTES AND PRODUCT THEREOF

BACKGROUND OF THE INVENTION

This invention relates to the handling of organic solid waste materials and more particularly to the converting of the combustible fraction of organic solid waste materials to a useable fuel material.

The disposal of organic solid wastes has become an increasingly severe problem in view of the increasing population, the concentration of populations in urban and suburban areas and the increasing number of industries generating organic solid wastes. A large fraction of such organic waste is combustible and is made up of such materials as paper, textiles, leather, rubber, yard wastes, wood, wood wastes and bark, garbage and some forms of plastics. The process of this invention is directed to the conversion of this combustible fraction of solid organic wastes into a finely divided product which can be used as a fuel or fuel supplement.

Inasmuch as it is becoming increasingly difficult to dispose of solid wastes by such previously used means as dumping and filling, a critical need has arisen to find other techniques for solid waste disposal, such techniques of necessity being those which do not create pollution problems and of preference those which do not require the expenditure of appreciable amounts of energy. Moreover, if the end product or products of the disposal process are themselves usable, the process is even more desirable.

In general, the processes more recently proposed for solid waste disposal may be classed as bulk reduction, conversion or reclamation. Although some advances in bulk reduction (densification) have been made, each of the techniques used (baling, incineration, etc.) have inherent drawbacks including disposal of the densified material, pollution control, and the like. Conversion is generally defined as the chemical or biochemical transformation of the waste material into a useful product; and the techniques used include pyrolysis (destructive distillation or decomposition at elevated temperatures, e.g., 750°–1600°F. in the absence of air or other reactive or oxidizing gases), composting (aerobic conversion of cellulose waste into inert humus-like material by aerobic bacteria), hydrogenation, wet oxidation, hydrolysis, anaerobic digestion, biological fractionation and the like.

Reclamation involves the separating out from the solid waste of such materials as glass, plastics, metals, papers, textiles and the like for reuse in one form or another. However, other than some forms of papers, plastics and textiles, the combustible component of organic solid wastes which have caloric value have not been recovered. Only recently has any serious attempt been made to convert these combustible material to a form in which they could be used as a fuel.

By the process of this invention it is possible to treat the combustible fraction of organic solid wastes to form a finely divided, relatively dense fuel or fuel supplement using a relatively small amount of energy and employing known apparatus components. The resulting product is a finely divided material usable as a fuel or fuel supplement in existing combustion equipment without requiring any substantial modification. This product retains essentially all of the dry weight and caloric content of the original solid organic waste material from which it is formed.

It is therefore a primary object of this invention to provide a process for treating the combustible fraction of solid organic wastes, the processing comprising the embrittlement of the solid organic wastes, to form it into a fuel or fuel supplement. It is another object to provide a process of the character described which can be carried out with the expenditure of relatively little energy so that the net result of the process is an energy gain in the form of caloric fuel.

A further object is to provide a process for destroying any fibrous characteristics of the solid organic waste to increase its bulk density and improve its handling characteristics. Still another object of this invention is the providing of such a process which does not involve substantial pyrolysis, decomposition, or chemical conversion and therefore does not generate pollution control problems. It is a further object of this invention to provide a process of the character described which can be carried out in available apparatus components and which can be readily adapted to conditions prevailing within a given area to form a fuel product best suited for the area in which it is produced or to be used.

It is another primary object of this invention to facilitate the separation of the organic and inorganic constituents of solid waste by selective embrittlement of the organic fraction.

It is yet another primary object of this invention to provide a unique fuel or fuel supplement formed from the combustible fraction of solid organic wastes. It is a further object to provide a fuel of the character described which retains essentially all of the dry weight and caloric value, in a greatly densified form, of the organic material from which it was formed. It is yet another object to provide such a fuel or fuel supplement which may be stored and handled without undergoing decomposition. An additional object is to provide a fuel of the character described which may be pelletized or compacted under pressure. It is a further object to provide a fuel supplement suitable for mixing with gaseous, liquid or solid hydrocarbon fuels either prior to or during combustion.

Other objects of the invention will in part be obvious and will in part be apparent hereinafter.

SUMMARY OF THE INVENTION

In brief, the process of this invention comprises treating a combustible solid organic waste with a mineral acid and heat to an elevated temperature under conditions to form an embrittled material, readily reducible to a finely divided form, without effecting any substantial pyrolysis, decomposition or loss in dry weight of the organic waste. The process may also include the steps of separating organic and inorganic fractions, primary gross size reduction and predrying before embrittlement and grinding, separating the fuel product from inorganics, pelletizing and mixing with other fuels subsequent to embrittlement.

The resulting fuel product is characterized as being an organic combustible material in embrittled form with caloric value and as having substantially the same weight on a dry basis, and a much greater density than the solid waste from which it was formed. It is further characterized as being suitable for use as a fuel in finely divided or pelletized form or in admixture with other fuels in different forms.

The invention accordingly comprises the several steps and the relation of one or more of such steps with respect to each of the other, and the article which possesses the characteristics, properties and relation of elements, all as exemplified in the detailed disclosure hereinafter set forth, and the scope of the invention will be indicated in the claims.

For a fuller understanding of the nature and objects of the invention, reference should be had to the following detailed description taken in connection with the following drawing which is a flow diagram of the process of this invention illustrating various embodiments and modifications.

In the following detailed description of this invention, the term "combustible fraction of solid organic wastes" will be used to designate generally the materials used in the process of this invention to form the unique product of this invention. This term encompasses all materials which are of organic origin and which, when they undergo combustion in the presence of oxygen, produce caloric energy. The term therefore, includes, but is not limited to, papers, paperboards, textiles, wood, wood wastes including barks, agricultural wastes including bagasse and the like, food wastes, yard wastes, rubber and some forms of plastics.

It will be seen from Table 1 that such materials make up the greater part of so-called solid municiple wastes.

Table 1

Composition of a Typical Solid Municipal Waste
% by Weight, Dry Basis

| Component | Total Waste | Combustible Organic Fraction |
| --- | --- | --- |
| Paper & Paperboard | 40.0 | 52.9 |
| Yard Wastes | 12.0 | 15.5 |
| Food Wastes | 9.3 | 12.1 |
| Wood | 8.4 | 10.9 |
| Textiles | 2.5 | 3.2 |
| Plastics | 2.5 | 3.2 |
| Rubber | 1.1 | 1.4 |
| Leather | 0.6 | 0.8 |
| Glass | 10.3 | |
| Metal | 7.1 | |
| Dirt | 5.3 | |

Thus substantially all of the organic material in solid wastes, e.g., in solid municipal wastes, can be subjected to the process of this invention to form a fuel. Such solid wastes typically have a moisture content of about 18%, almost all of which is associated with the combustible organic fraction. The food wastes may contain oleaginous materials in the form of meat fat, oils, etc. The presence of such materials introduces no problems in the process of this invention at the levels at which they normally occur in typical solid municipal wastes.

Inasmuch as about one-half of the solid organic wastes which can be expected to be available from an urban area comprises paper, and inasmuch as this paper constituent is usually a mixture of newsprint and corrugated board, it is possible to use a mixture of these types of papers as one model for determining the parameters of the treating step. However, the examples included herein also cover the treatment of typical food wastes, agricultural wastes and yard wastes, as well as the results of a pilot plant run on actual solid municipal wastes.

DESCRIPTION OF PREFERRED EMBODIMENTS

The drawing diagrams the various embodiments and modifications of the process of this invention along with possible optional steps (designated by an asterisk *) which may be performed.

If, as shown in the drawing the process begins with a mixed solid waste, e.g., a solid municipal waste, it will generally be expedient to begin with some form of primary size reduction such as shedding. This preliminary step may conveniently be done in such equipment as flail mills, hammer mills, shredders, shears, cage disintegrators, chippers, cutters, disk mills, grinders, hoggers, rasp mills and the like.

The physical separation of the organic combustible fraction from the mixed waste may be accomplished by one or more of several known techniques including separation procedures based upon differences in such physical characteristics as size, shape, specific gravity, brittleness, elasticity, color, reflectance, magnetic susceptibility, electric conductivity, absorption of electromagnetic radiation and radioactivity. Techniques and apparatus for using these characteristics to sort out such nonorganic materials as glass, metals, dirt, and the like are known and described in the literature. (See for example "Solid Waste Treatment Technology" by Alex Hershaft in *Environmental Science ɉ Technology*, Vol. 6, No. 5 pp 412–421 (1972).)

The separation of the organic and inorganic fractions may be postponed until after the embrittled material is ground, thus making it possible to readily separate the powdered organic fraction from the inorganic fraction. In some cases, the waste pieces making up the inorganic fraction may be used as all or part of the grinding medium.

It is, or course, within the scope of this invention to begin with solid organic waste material which requires no sorting or separating from other waste materials. In such cases, it may be desirable or necessary to perform a size reducing step using appropriate equipment from the list given above. Thus for example hammermills, shredders or grinders can be employed to reduce such materials as paper, wood, textiles or food wastes to the desired degree of comminution. In like manner, it may be desirable to further reduce the size of the combustible organic fraction from mixed wastes subsequent to the separation of this fraction from a waste mixture.

The actual size of the waste material fragments which are subjected to the embrittlement treatment will depend upon the nature of the organic material as well as the manner and apparatus used to effect the embrittlement treatment. Thus, for example, it will generally be preferable to reduce the waste to a size amenable to ready handling in the equipment used in the process.

The embrittlement step, as will be described in more detail below, comprises treating the organic waste material with a mineral acid in a controlled temperature range for a time sufficient to effect the embrittlement. As noted, inorganic wastes may be separated from the organic wastes either prior to or subsequent to the embrittling.

In the process of this invention it is possible to treat waste materials as received without removing moisture contained therein. However, predrying may be desirable to permit the venting of the water vapor thus removed directly into the atmosphere without creating pollution problems such as might be generated if drying were carried out during or after treatment with acid.

If drying is to be done prior to embrittlement in a separate reactor, it can be done in such apparatus as a cocurrent or countercurrent direct or indirect fired dryer. It is also of course, possible to combine the predrying step with one of the size reducing steps, using heated surfaces and/or the circulation of a hot gas within or through the apparatus in which size reduction is accomplished. It is also possible to combine the drying step with the embrittling step, particularly if embrittling is carried out by heating followed by acid treatment. If drying is made part of the total embrittling step (heating and acid treatment) then the moisture recovered may be vented directly to the air if provision is made to remove the acid therefrom prior to such venting. Therefore, it may be preferable to predry, if and when this step is necessary, prior to the acid treatment. Alternatively, an acid absorber may be used. Such an absorber is particularly useful where materials which generate a volatile acid may be encountered.

Other than any plastic materials and rubbers which may be processed, most of the solid organic wastes treated in this invention are generally fibrous in nature, a fact which means that it is not possible to increase the bulk density of solid organic wastes by grinding alone without the expenditure of excessive amounts of energy. However, when these materials are embrittled using a combination of heat and acid according to this invention, the resulting embrittled material may be readily ground with little expenditure of energy to form a product with a bulk density of from about 20 to 30 pounds per cubic foot, compared to 3 to 6 pounds per cubic foot for the shredded untreated waste. This bulk density of the treated material may be further increased up to as much as 70 pounds per cubic foot with compaction under pressure.

It may be postulated that the embrittlement effects some depolymerization of the organic material as evidenced by the loss of its fibrous nature. Embrittlement by the present process does not, however, involve pyrolysis, decomposition or combustion to any significant extent as evidenced by the fact that where results no appreciable loss of dry weight, no significant production of identifiable decomposition or degradation products such as acetone, alcohols and the like and no identifiable products of combustion such as char, and combustion gases. There is, moreover, no appreciable change in the carbon/hydrogen/oxygen ratios of the organic material after embrittlement.

As will be seen from the drawing, there are several embodiments and modifications possible in the embrittlement step. Before discussing each of these in detail, it will be convenient to set forth the operational parameters, e.g., temperatures, acid concentrations, etc., which apply to all of these embodiments and their modifications.

Since embrittlement does not involve any appreciable pyrolysis, thermal degradation or combustion, the conditions under which this step is performed should be such as to prevent such reactions from occurring to any appreciable extent. Although temperatures may range between 212° and 550°F, it is preferable to use temperatures in the heat treating which range between about 250° and 350°F. The use of temperatures not above 350°F makes it possible to use hot air as the means for heating the material during embrittlement. If temperatures much in excess of 350°F are used, then care must be taken to use an atmosphere of reduced oxygen content to prevent combustion of the organic material. Thus, for maximum yield, the combination of temperature and oxygen content of the surrounding atmosphere must be such that no significant combustion or pyrolysis will occur during embrittlement.

The heating of the organic waste material may be accomplished by direct heat transfer from a hot gas, e.g., hot flue or stack gases or hot air, to the material. It may also be accomplished by indirect heat transfer from a heat transfer fluid through any suitably designed heat exchanger. If a grinding step is combined with the embrittling step, then the grinding medium (e.g., steel, ceramic balls or inorganic waste) or the walls of the apparatus in which grinding is effected may be heated and serve as the only or as one source of heat. It is, of course within the scope of this invention to employ any suitable combination of direct and indirect heating procedures.

The acid used in the embrittling step should be a mineral acid (HCl, $H_2SO_4$ $HNO_3$ or $H_3PO_4$) or what may be termed a precursor of such a mineral acid. Among the compounds which may be regarded as acid precursors are strongly acid metal salts of a mineral acid, e.g., $ZnCl_2$ or $FeCl_3$ or an inorganic acidic gas, e.g., $SO_3$, $NO_2$ or $N_2O_5$. The acid or acid precursor may be used in gaseous form (gaseous HCl or $SO_3$, for example) or in liquid form (dilute aqueous solution of $H_2SO_4$ or HCl or alcoholic solution of $ZnCl_2$, for example). The use of a volatile acid (e.g., an acid having a boiling point below the temperature used) such as HCl gas may have advantages in a batch process and in those embodiments of the embrittling step where heating precedes acid treating (I of FIG. 1) or where heating and acid treating are carried out simultaneously (III or FIG. 1). The use of a nonvolatile acid (i.e., an acid having a boiling point above the temperature used) such as a dilute aqueous solution of $H_2SO_4$ may have advantages in a continuous process and in that embodiment of the embrittling step where heating follows acid treating. Thus in this latter case, the organic material, after being sprayed with or soaked in the acid solution, may be pressed to 50 to 70% dryness or otherwise treated to remove at least a portion of the water absorbed in the acid treatment before heating. Some energy will of course be required in the subsequent drying of the resulting moist material.

When a volatile acid is used and is carried in a treating gas, the amount of residual acid in the final product is not directly related to the concentration of the acid in the treating gas. Therefore, there is a wide latitude possible in the concentration of the volatile acid in the treating gas, and the optimum concentration may readily be determined consonant with such operational parameters as temperature, time of exposure of the waste to the gas, form of gas-solids contacting, materials from which the treating apparatus is formed and the like. Exemplary of such concentrations are those which provide dosages of from about 0.1 to 5% by weight of the organic waste. The term "dosage" is used hereinafter to refer to the total quantity of acid reactant, based upon organic waste weight, to which the organic waste is exposed during treatment. In some cases, if the acid is essentially completely absorbed by the waste material, dosage may be equivalent to the weight percent of acid pick-up. Normally, the higher concentrations are preferred since the embrittlement will generally proceed more rapidly.

In the use of a nonvolatile acid, e.g., an aqueous solution of $H_2SO_4$, the acid pickup in the organic waste is proportional to the acid concentration in the solution. It is therefore preferable in this embodiment of the embrittling step to use acid solutions which provide dosages ranging between about 0.1 and 5% by weight.

The length of time during which the organic material is exposed to the embrittling step will vary, depending upon the embodiment of this step used, the size of the waste material being treated, and the conditions of treatment, i.e., temperature and acid dosage (time and concentration). The time must be at least sufficient to bring the material up to temperature and to effect embrittlement. Normally, when heating and acid treatment are done simultaneously, this time will not be in excess of about 30 minutes; and if the higher temperatures and higher acid concentrations are used, embrittlement may be accomplished in only a few minutes, e.g., about 5 minutes. For any given size of organic material, taken in conjunction with the operational parameters chose, it is a simple matter to choose an optimum time to give a product having a desired proportion of embrittled, friable product. This, it may be desirable to carry out embrittlement until only a predetermined fraction of the material being processed has reached the desired stage of embrittlement and to recycle that fraction which has not.

Some of the components making up the solid organic wastes treated have water associated with them. This water may be chemically bonded or mechanically held within the organic mass and its content in the embrittled material resulting from the combined heat and acid treating should not exceed about 10% by weight and preferably the embrittled product should be as dry as possible for ease of grinding.

The use of flue or stack gases as a means for directly heating the material during embrittlement introduces the possibility of introducing steam (water vapor as contrasted to water associated with the organic waste material) into the embrittling step. It has been found that the presence of such steam does not materially affect the embrittlement of the organic material.

As indicated in the drawing, the embrittling step may be carried out in one of several ways. If as in embodiments I and II, heating and acid treating are to be done separately, then heating may be accomplished in such equipment as a cocurrent or countercurrent direct or indirect fired dryer, a fluid bed, a multiple hearth roaster, a multi-deck digester or the like. If a volatile acid is used, such as gaseous HCl, this may be applied in any suitable gas-solid contacting device such as a cocurrent or countercurrent flow mixer to the heated material. If a nonvolatile acid is used, such as an aqueous solution of $H_2SO_4$, it may be sprayed on as the waste material is moved on a belt conveyor; or it may be applied by moving the waste material through an acid bath, in which case the excess acid may be removed by pressing through rollers or the like.

If heating and acid treatment with a volatile acid are to be carried out simultaneously, then this combined step may be done in a rotary dryer into which a stream of HCl gas may be done in a rotary dryer into which a stream of HCl gas is introduced.

Since it is also possible in some of the embrittling equipment to apply a degree of attrition sufficient to pulverize or grind the embrittled material, the step of grinding may be combined with embrittlement using, for example, a tumbling device such as a ball mill.

If grinding is to be carried out as a separate step it may be done in such apparatus as ball mills and pulverizers or between abrasive surfaces. Since the organic material is embrittled, grinding, whether it is carried out separately or as part of the embrittling step, requires relatively little energy compared with that required for grinding the untreated solid organic waste material to the same degree of fineness. This fact is one of the principal energy conserving aspects of the process of this invention.

The particle size of the embrittled fuel product may vary over a relatively wide size range, depending upon such factors as type and degree of grinding etc. Generally, the greater portion of the material will pass a 40-mesh screen(i.e., about 0.0165 inch or smaller) and a considerable portion will pass a 200-mesh sieve (i.e., about 0.0029 inch or smaller). The larger particles which may not be completely embrittled may be recycled to the embrittling step.

If separation of the product ground material is necessary it is preferably done by air classification, although screening may be used. In this optional step it is possible to sort out organic fragments which have not been completely embrittled as well as nonorganic material (e.g., small pieces of metal, glass, etc.) from the fuel product. The incompletely embrittled organic fragments may be recycled back to the embrittling apparatus.

If the waste material being treated is a combination of inorganic and organic fractions, i.e., no separation or only partial separation of these fractions having been effected prior to the embrittling treatment, then it will be necessary to separate out the nonembrittled fraction subsequent to grinding. This nonembrittled fraction will contain the inorganics and may contain some nonembrittled or partially embrittled organic wastes. The nonembrittled or partially embrittled organic materials may be recycled to the embrittlement treatment of heat and acid to complete their treatment. It should be noted that in such a case where there is no separation of the combustible and noncombustible fractions of the waste prior to embrittlement, at least a portion of the noncumbustible fraction (e.g., metal and glass objects) can be used as the grinding medium.

As shown in the drawing, it is also possible to perform embrittlement (heating and acid treating) and grinding in a liquid fuel, such as for example in a No. 6 fuel oil. This modification is particularly applicable to those cases where complete embrittlement is achieved and no sorting or classification is necessary after grinding. Thus, for example, where the organic material is essentially all paper, it is possible to ensure complete embrittlement and grind all of the product to a desired particle size range in a liquid fuel to form a slurry of the fuel product directly in the liquid fuel. This may be done, for example, by ball milling the paper in hot fuel oil to which acid has been added.

The fuel product which results from grinding, and classification if required, is a fine powdery material. As will be apparent from the examples given, the product retains essentially all of the dry weight of the original solid organic waste from which it was made and has essentially the same carbon/oxygen/hydrogen ratios that were present in the solid untreated organic waste. Little, if any, caloric value is lost in the embrittlement. The embrittled product when formed by treatment with HCl contains only a small amount of chloride ions, e.g., typically 0.1 to 0.2% by weight, although it may be up to 0.6%. That product formed by using $H_2SO_4$ will contain sulfate ions essentially in direct proportion to the quantity of acid pickup in the treating.

The fuel product may be burned in finely divided form as a primary fuel without the addition of any other fuel. The fuel product may also be pelletized, with or without the use of a binder such as water, starch, wax, mineral oil and the like, in standard pelletizng equipment. Finally, the fuel product may be compacted under pressure to form a highly dense material.

The fuel product of this invention may also be mixed with gaseous, liquid or solid fuels (referred to hereinafter as primary fuels) to serve as a secondary fuel. Such mixing may be prior to or during combustion. Thus, for example, it may be entrained in natural gas or fed simultaneously with natural gas through separate injection apparatus into a combustion chamber; it may be slurried with fuel oil or cofired therewith; and it may be physically mixed with powdered coal or cofired with it.

The data in Table 2 illustrate the effect of adding a fuel product of this invention formed from paper to No. 6 fuel oil.

Table 2

| Fuel Composition Btu Contributed by | | | | | |
|---|---|---|---|---|---|
| Fuel Oil | Solid Fuel Product | Fuel Oil | Solid Fuel Product | Btu/lb Total Fuel | Btu Based on 1 lb Fuel Oil |
| — | 100 | — | 8,000 | 8,000 | |
| 100 | — | 19,588 | — | 19,588 | |
| 85 | 15 | 16,650 | 1,200 | 17,850 | 20,788 |
| 60 | 20 | 15,670 | 1,600 | 17,270 | 21,188 |

These data indicate that the fuel product contributes caloric value to the fuel oil. In such a mixture, each fuel constituent contributes its caloric value in direct proportion to its weight fraction.

The fuel product of this invention may be added to fuels other than the so-called fossil fuels. These other fuels include, but are not limited to, combustible hydrocarbon wastes, waste fuels, waste solvents (with or without water), sewage sludge and the like. The amount of fuel product added to a fossil fuel or any other type of fuel will depend upon the caloric value desired of the mixed fuel, a property which can readily be measured by known techniques.

The process and article of this invention may be described further in the following examples which are meant to be illustrative and not limiting.

EXAMPLE 1

Newsprint was used as a model for a solid inorganic waste material and the embrittling step was carried out in a stainless steel tube reactor 2⅜ inches i.d., and 19 inches long. Ten grams of the newsprint in the tube was exposed to hot air containing HCl gas circulated through the tube at a flow rate of 1 liter/minute. A standard grind test was devised to determine the effectiveness of the process and was used in all of the following examples. In this test a 1-quart paint can loaded with 600 grams of quartz pebbles about 1 inch in diameter was charged with the total reactor product and shaken on a commercial paint shaker for 10 minutes. The resulting powder was examined for the presence of unground flakes and was then screened to determine what percentage passed through a 40-mesh screen (420 microns or smaller) and what percentage passed through a 200-mesh screen (74 microns or smaller).

The yield of product based on the weight of the original solid organic waste including moisture (normally about 6%) was determined and the densities of the uncompacted and compacted products were measured.

Data thus obtained for newsprint samples are summarized in Table 3.

Table 3

| Fuel From Newsprint | | | | | | | |
|---|---|---|---|---|---|---|---|
| | | | | Grind Test % Through | | Density Lbs/ft³ | |
| Temp. °F | Time Min. | HCl Dosage* | Yield % | 40- Mesh | 200- Mesh | Uncom- pacted | Com- pacted |
| 300–350 | 5 | 1.8 | 94 | 99 | 80 | 25 | 52 |
| 300–350 | 10 | 3.6 | 91 | 98 | 50 | 26 | 55 |
| 350–400 | 5 | 1.8 | 94 | 98 | 70 | 25 | 54 |
| 350–400 | 10 | 3.6 | 86 | 98 | 75 | 28 | 50 |

*total quantity of HCl, based on sample weight, passing through reactor.

Since the yield figures are based upon a newsprint having a moisture content in equilibrium with the atmosphere (about 5 to 6%) it will be seen that when this moisture content is added to the yield figures that yields as high as about 99% were obtained.

EXAMPLE 2

The acid treatment in this example consisted of soaking pieces (about 1 × 4 inches) of corrugated board in a dilute aqueous solution of $H_2SO_4$. Subsequent to 2-minute soak, the corrugated board pieces were withdrawn and the excess water was pressed out by pressing between two blotters. Then the samples were heated in air at 350°F for 10 minutes before subjection to the standard grind test described in Example 1. The results for two samples are summarized in Table 4.

Table 4

| Fuel From Corrugated Board | | | |
|---|---|---|---|
| | | Grind Test % Through | |
| Sample No. | $H_2SO_4$ Dosage* | 40- Mesh | 200- Mesh |
| 1 | 1.4 | 80 | 55 |
| 2 | 2.5 | 99 | 62 |

*weight % pickup.

EXAMPLE 3

A mixture of about 75% by weight newsprint and 25% corrugated board, cut to pieces of about ¾ × ¾ inch to accommodate the equipment used, was treated to serve as a model of organic waste. A ball mill, having different types of grinding media, was heated to 400°F before 10 grams of the paper waste was introduced. HCl gas was bled into the ball mill during treating and the acid dosage was varied. The data from 5 runs using various acid dosages, grinding media, and grinding times are summarized in Table 5.

Table 5

| Fuel From Paper Mixture | | | | | | | | |
|---|---|---|---|---|---|---|---|---|
| | Grinding Medium | | Total HCl Dos- age | Time Min. | Grind Test % Through | | Density Lbs/ft³ | |
| Type | Bulk Lbs/ft³ | Units/ lb | | | 40- Mesh | 200- Mesh | Uncom- pacted | Com- pacted |
| ¾" ceramic balls | 104 | 45 | 5.5 | 15 | 82 | 10 | 21 | 42 |

Table 5-continued

| Type | Grinding Medium Bulk Lbs/ft³ | Units/ lb | Fuel From Paper Mixture Total HCl Dosage | Time Min. | Grind Test % Through 40-Mesh | Grind Test % Through 200-Mesh | Density Lbs/ft³ Uncompacted | Density Lbs/ft³ Compacted |
|---|---|---|---|---|---|---|---|---|
| " | 104 | 45 | 11.0 | 30 | 97 | 50 | 24 | 49 |
| ⅜" steel balls | 312 | 126 | 5.5 | 15 | 92 | 60 | 30 | 71 |
| " | 312 | 126 | 11.0 | 30 | 98 | 70 | 28 | 67 |
| Inorganic Trash | 62 | | 5.5 | 15 | 55 | 15 | — | — |

EXAMPLE 4

Papers other than newsprint and corrugated board were processed in the laboratory reactor, described in Example 1, using hot air at 375°F, and an HCl dosage of 1.5% by paper weight, for 4 minutes. The paper samples had a moisture content in equilibrium with the atmosphere. The data of Table 6 illustrates the applicability of the process of this invention to these widely varying types of paper.

Table 6

| Type of Paper | Fuel From Waste Papers Thickness Inch | Yield % | Ground Test % Through 40-Mesh |
|---|---|---|---|
| Soap carton (heavy boxboard) | .029 | 83 | 98 |
| Milk carton (polyethylene coated bleached kraft) | .018 | 86 | 92 |
| Beer carrier (heavy kraft) | .016 | 91 | 35–70 |
| Coated magazine (free sheet) | .004 | 95 | 85 |
| Coated magazine (ground-wood base) | .002 | 90 | 99 |
| Office Bond | .003 | 95 | 100 |
| Grocery bags (light kraft) | .007 | 91 | 85 |
| Foil-lined juice paper cans | .030 | 90 | 20–40 |

EXAMPLE 5

Miscellaneous items which might be found in solid municipal wastes were treated in the laboratory reactor (Example 1) by circulating air at 375°F, containing 2 ¼% by volume HCl, for 5 ½ minutes at a flow rate of 1 liter/minute. Since successful grinding requires a moisture content of less than about 10% by weight, the items of this example, representative of garbage and trash, were predried at 220°F to essentially 0% moisture and then allowed to regain equilibrium moisture (5–10% by weight) before embrittlement. These materials were successfully formed into a product as shown by the data of Table 7.

Table 7

| Material | Fuel from Miscellaneous Organic Wastes Yield % | Grind Test % Through 40-Mesh |
|---|---|---|
| Leaves and pine needles | 90 | 99 |
| Evergreen clippings | 91 | 99 |
| Preshredded twigs | | 70 |
| Apple core | 80 | 100 |
| Banana skin | 80 | 95 |
| Ham slice | 96 | 80 |
| Citrus peels | 93 | 95 |
| Melon rinds | 92 | 95 |

Table 7-continued

| Material | Fuel from Miscellaneous Organic Wastes Yield % | Grind Test % Through 40-Mesh |
|---|---|---|
| 25% beef trimmings 75% newsprint | 89 | 99 |

EXAMPLE 6

A sample of shredded municipal solid waste was charged to a 2 × 10 feet rotary dryer fired with hot flue gas which entered the dryer at about 600°F. The sample was initially dryed and heated to 300°F (as measured within the dryer) at which time HCl gas in a concentration of about 1 volume % was added to the flue gas used for heating the reactor. The addition of the acid gas was continued for about 20 minutes. It was observed that the mechanical abrasion in the rotary dryer was adequate to pulverize a significant portion of the organic fraction to small flakes. The data in Table 8 illustrate the results obtained by grinding the heavy materials found in the dryer after removing therefrom.

Table 8

| Material ground | Treatment of Municipal Waste Grind Test % Through 40-mesh | Grind Test % Through 200-mesh |
|---|---|---|
| Large-pieces corrugated board | 75 | 30 |
| Mixed organic waste | 80 | 60 |

EXAMPLE 7

Ten grams of virgin newsprint was treated with HCl gas in the laboratory reactor described in Example 1. The HCl dosage was 3.6% (total quantity of HCl, based on sample weight, passing through the reactor), the time of the embrittlement was 10 minutes and the temperature ranged between 300° and 325°F. The product, amounting to a 92% weight yield, was subjected to the grind test described in Example 1 and it was found that 98% of the resulting powdered embrittled material passed a 40-mesh screen and 60% passed a 200-mesh screen.

The product and a control sample of the original virgin newsprint were analyzed by standard microanalytical tecniques to determine the percentages of carbon, hydrogen, chlorine and oxygen present. The control sample was found to have 5.8% by weight moisture and the embrittled product 1.7%. The results of these analyses are summarized in Table 9.

Table 9

| Element | Elemental Analyses, % By Weight (Dry Basis, Average of Two Samples) | |
|---|---|---|
| | Control Sample | Embrittled Product |
| Carbon | 48.54 | 48.04 |
| Hydrogen | 6.45 | 6.04 |
| Chlorine | 0.04 | 0.30 |
| Oxygen | 45.03 | 45.62 |

These figures show that no appreciable change in the carbon/hydrogen/oxygen ratio is effected by embrittlement. They also show that no appreciable decomposition or pyrolysis has taken place. The chlorine pickup was about 0.26% by weight.

It will thus be seen that the process of this invention makes it possible to form a useful fuel from solid organic wastes. By embrittling the organic wastes prior to size reduction the amount of energy to produce a usable material is materially reduced over that which would be required if the material were not embrittled. The fuel thus produced may be used in many different ways.

It will thus be seen that the objects set forth above, among those made apparent from the preceding description, are efficiently attained and, since certain changes may be made in carrying out the above process and in the article set forth without departing from the scope of the invention, it is intended that all matter contained in the above description or shown in the accompanying drawing shall be interpreted as illustrative and not in a limiting sense.

We claim:

1. A process for embrittling the solid organic waste fraction of a solid waste material characterized by the treating of said organic waste fraction with up to 11% of mineral acid based on the weight of said solid organic waste fraction and at elevated temperature, the quantity of said acid and the time and temperature of said treating being such as to form an embrittled material, readily reducible to a finely divided form, without any substantial carbonization, any substantial pyrolysis, any substantial decomposition or any substantial loss in dry weight of said solid waste fraction.

2. A process in accordance with claim 1 wherein said waste is solid municipal waste.

3. A process in accordance with claim 1 wherein said solid waste contains wood wastes.

4. A process in accordance with claim 1 wherein said solid waste contains agricultural wastes.

5. A process in accordance with claim 1 wherein said treating is accomplished at a temperature ranging between about 212°–550°F.

6. A process in accordance with claim 5 wherein said treating is accomplished at a temperature ranging between about 250° and 350°F.

7. A process in accordance with claim 1 wherein said treating comprises exposing said waste first to said acid and then to said elevated temperature.

8. A process in accordance with claim 1 wherein said treating comprises exposing said waste to said acid and elevated temperature simultaneously.

9. A process in accordance with claim 1 wherein said treating comprises exposing said waste first to said elevated temperature and then immediately to said acid.

10. A process in accordance with claim 1 wherein said acid is in the form of a gas.

11. A process in accordance with claim 10 wherein said acid is HCl gas.

12. A process in accordance with claim 1 wherein said acid is in the form of a solution.

13. A process in accordance with claim 12 wherein said acid is $H_2SO_4$ and said solution is an aqueous solution.

14. A process in accordance with claim 1 wherein said treating at elevated temperature comprises contacting said waste with a hot gas.

15. A process in accordance with claim 14 wherein said hot gas is flue gas.

16. A process in accordance with claim 14 wherein said hot gas is air.

17. A process in accordance with claim 14 wherein said hot gas contains said mineral acid in vapor form.

18. A process in accordance with claim 1 wherein said treating at elevated temperature comprises contacting said waste with a heated surface.

19. A process in accordance with claim 18 wherein said heated surface is a grinding medium.

20. A process in accordance with claim 1 wherein said treating of said waste is carried out in a liquid fuel medium.

21. A process in accordance with claim 20 wherein said fuel medium is fuel oil.

22. A process for forming a combustible fuel from solid municipal waste containing an organic waste fraction and an inorganic waste fraction, comprising the steps of a. treating the solid organic waste fraction of solid municipal waste with up to 11% of mineral acid based on the weight of said solid organic waste fraction, and elevated temperature under conditions to form an embrittled material without effecting any substantial carbonization, any substantial pyrolysis, any substantial decomposition or any substantial loss in dry weight of said waste component; and b. reducing the resulting embrittled material to a finely divided form.

23. A process in accordance with claim 22 including the step of reducing the size of the components forming said solid, municipal waste.

24. A process in accordance with claim 22 including the step of separating said organic waste fraction from said municipal waste prior to said treating step.

25. A process in accordance with claim 22 including the step of separating said organic waste fraction from said municipal waste subsequent to said treating step.

26. A process in accordance with claim 22 including the step of predrying said organic waste fraction prior to said treating step.

27. A process in accordance with claim 22 including the step of adjusting the moisture content of said embrittled material to not more than about 10% on a dry weight basis just prior to said step or reducing said embrittled material to a finely divided form.

28. A process in accordance with claim 22 including the step of classifying said embrittled material subsequent to said step of reducing said embrittled material to a finely divided form thereby to separate out particles of said solid organic waste which are not embrittled.

29. A process in accordance with claim 28 including the step of returning at least a portion of said particles which are not embrittled to a second treating step.

30. A process in accordance with claim 22 wherein said step of reducing said embrittled material to a finely divided form comprises grinding.

31. A process in accordance with claim 30 wherein said grinding is effecting by milling with a grinding medium.

32. A process in accordance with claim 31 wherein said grinding medium comprises said inorganic waste fraction.

33. A process in accordance with claim 22 including the step of pelletizing said embrittled material.

34. A process in accordance with claim 22 including the step of compacting said embrittled material.

35. A process in accordance with claim 22 including the step of mixing said embrittled material in finely divided form with a primary fuel.

36. A process in accordance with claim 35 wherein said primary fuel is in fluid form.

37. A process in accordance with claim 36 wherein said primary fuel in fluid form is a liquid and said embrittled material is slurried therein.

38. A process in accordance with claim 37 wherein said primary fuel is fuel oil.

39. A process in accordance with claim 37 wherein said primary fuel is combustible hydrocarbon waste.

40. A process in accordance with claim 37 wherein said primary fuel is sewage sludge.

41. A process in accordance with claim 36 wherein said primary fuel in fluid form is a gas and said embrittled material is entrained therein.

42. A process in accordance with claim 35 wherein said primary fuel is a solid fuel.

43. A process in accordance with claim 42 wherein said solid fuel is powdered coal.

44. The combustible fuel material made by the process of claim 22.

45. The combustible fuel material in accordance with claim 44 further characterized as having a density of at least 20 pounds per cubic foot.

46. The combustible fuel material in accordance with claim 44 being further characterized as being in pellet form.

47. The combustible fuel material in accordance with claim 44 being further characterized as being compacted to a density of at least 40 pounds per cubic foot.

48. The combustible fuel material resulting from the process of claim 35.

49. The fuel material resulting from the process of claim 36.

50. The fuel material resulting from the process of claim 37.

51. The fuel material resulting from the process of claim 38.

52. The fuel material resulting from the process of claim 39.

53. The fuel material resulting from the process of claim 40.

54. The fuel material resulting from the process of claim 41.

55. The fuel material resulting from the process of claim 42.

56. The fuel material resulting from the process of claim 43.

57. The combustible fuel material made by the process of claim 1.

58. The process as defined in claim 22 wherein said solid organic waste fraction is mixed with oil prior to said embrittlement.

* * * * *